United States Patent Office 3,525,206
Patented Aug. 25, 1970

3,525,206
NYLON TIRE CORD
Solomon P. Hersh, Raleigh, Norman W. Boe, Durham, and George C. Stow, Jr., Chapel Hill, N.C., assignors to Monsanto Company, St. Louis, Mo., a corporation of Delaware
No Drawing. Filed Jan. 19, 1965, Ser. No. 426,661
Int. Cl. D02g 3/02
U.S. Cl 57—140    7 Claims

ABSTRACT OF THE DISCLOSURE

Nylon tire cords are made resistant to flatspotting by diffusing throughout the yarns which make up the cords an organic hydroxylated plasticizer in an amount sufficient to decrease the cord modulus by at least 10 percent.

---

The use of nylon as a reinforcing fiber for rubber vehicle tires is well known to the art. Other fibers such as cotton, rayon, etc. have also been used in this capacity but nylon is preferred due to its superior qualities such as higher tenacity, improved fatigue resistance, and superior wearing quality. On the other hand, nylon possesses a serious drawback when used to reinforce vehicle tires in that such tires have a significant tendency to flatspot. Flatspotting is a phenomenon which occurs when an inflated tire is operated for a period of time on a vehicle and then is allowed to stand at rest. The area of the tire which is in contact with the surface on which it rests becomes flat, thus creating a flattened portion on the circular tire which, on standing, sets in place. This phenomenon is not completely understood but is thought to be associated with the complex forces of compression and tension which are different at the area of the tire which is resting on the surface than in the other portions of the tire, and to the elongation-contraction properties of the nylon cord. When a vehicle is started, this flatspot causes considerable vibration and bumping each time the tire rotates. Of course, after the tire is again operated for a prolonged period it becomes warm and thus the flatspot disappears. The period of time and the amount of mileage necessary to eliminate the flatspot is one method of measuring the flatspot and is referred to as "runout." Another method of measuring the amount of flatspot is the depth of the flatspot.

It is an object of this invention to provide a nylon tire cord which is particularly resistant to flatspotting.

It is a further object of this invention to provide a process for producing a nylon tire cord which is particularly resistant to flatspotting.

It is a still further object of this invention to provide a vehicle tire reinforced with nylon cord which exhibits minimum flatspotting.

These and other objects will become apparent from the description given hereinafter.

The term "nylon" as used herein is intended to denote fibers produced from synthetic linear polycarbonamides which contain recurring carbonamide linkages as an integral part of the polymer chain. These polyamides are well known in the art and are generally referred to therein as nylons. Since these polyamides are well known to the art, a lengthy discussion of their exact nature would serve no useful purpose herein. However, it may be pointed out that these polyamides are produced by the polymerization reaction between a dicarboxylic acid and a diamine, or by the interpolymerization of an amino acid. Typical nylons suitable for use in accordance with the present invention are polyhexamethylene adipamide (nylon 66), polyhexamethylene sebacamide (nylon 610), polyhexamethylene dodecanediamide (nylon 612), polycaproamide (nylon 6), and the like. The preferred nylons for use as reinforcing fibers for rubber vehicle tires in accordance with the present invention are polyhexamethylene adipamide (nylon 66) and polycaproamide (nylon 6). The nylons used as reinforcing fibers for the articles of the present invention may be either homopolyamides or copolyamides or mixtures of the same.

The term "rubber vehicle tires" as used herein is meant to include vehicle tires made from natural rubber and synthetic rubber such as butyl, chloroprene, thiokols, buna, and styrene-butadiene rubbers, as well as mixtures of such synthetic rubbers and mixtures of synthetic and natural rubbers. The rubber vehicle tires referred to herein are meant to include those tires in which are employed conventional additives such as vulcanization agents, antioxidants, extenders, carbon black and the like.

The term "cord modulus" as used herein refers to the modulus as determined by ASTM Method D 885–64T, Section 36. While the modulus may be determined at any given temperature, for purposes of uniformity, the cord modulus values referred to herein were all determined at 25° C.

A recent significant advance in the area of nonflatspotting nylon tires has been the discovery that tires reinforced with nylon tire cords which have a moisture content greater than 3 percent result in a significant reduction in the flatspotting severity of the tire. However, due to adhesion and vulcanization problems resulting from the presence of water, it has been found necessary that the water be introduced into the nylon cords after the fabrication of the tire. This need for post treating has the obvious disadvantage of adding an additional process step to an already complex process for fabricating nylon reinforced vehicle tires.

We have now found quite unexpectedly that nylon reinforced tires show minimum flatspotting results when the reinforcing cords are conventional polyamide (nylon) tire cords which have a total denier above 1000 and have diffused therein, substantially throughout the individual yarns which make up the tire cord, an organic hydroxylated plasticizer in a nonmolecular, interstitial relationship to the cord molecules, and in an amount sufficient to decrease the cord modulus at 25° C. of the nylon cord by a value of at least 10 percent. This discovery is surprising inasmuch as prior to this time, it has been generally thought that plasticization of nylon tire cord would adversely affect the flatspotting, that is, the flatspot severity of the tires produced from plasticized nylon cords would increase. We have found however, that while the nylon tire cord of the present invention which is plasticized does show the effects of plasticization prior to introduction into the tire, for example, the decrease in modulus, these plasticization effects do not exist, at least not in the theorized manner, on the tire as finally fabricated from these cords.

A normal tire cord which is to be used to reinforce rubber vehicle tires goes through certain processing steps prior to the fabrication of the tire. These processing steps are conventional and well known in the art of tire making. Thus, conventionally, a cord which is about to be used in the tire is first dipped in an adhesive solution, for example, a resorcinol-formaldehyde rubber latex, and thereafter dried by passing through two drying zones. The first of these zones is generally maintained between about 300° F. and about 350° F. and, while passing through this zone, sufficient tension is applied to the cord to stretch it about 3 percent. The dwell time in this first zone is about 60 seconds. The cord upon emerging from this first zone is passed into a second zone and stretched about 9 percent while heated to a temperature of between about 400 and 500° F. with a dwell time of from 20 to 60 seconds. The nylon tire cords of the present invention, due to their novel characteristics, require a slight modification in this conventional process. When a nylon cord of the present invention is passed through the adhesive dip prior to any drying step, it is found that it does not pick up enough adhesive to function properly in the tire. Thus, in accordance with the process for producing nonflatspotting vehicle tires with the nylon tire cords of the present invention, the tire cord which already contains a plasticizer diffused therein is passed through the first drying zone which is maintained at between about 300° F. and 350° F., while sufficient tension is applied to the cord to allow about a 3-percent stretch and for a dwell time of about 60 seconds, thereafter the cord is dipped in an adhesive solution and then passed through the second drying zone heated to between about 400° F. and about 500° F. for a dwell time of about 20 to 60 seconds and with sufficient tension applied to the cord to allow a stretch of about 9 percent. When the nylon tire cords of the present invention are processed in this manner, it is found that when they emerge from this hot stretching operation, the effects of plasticization are no longer evident inasmuch as the 25° C. cord modulus of the cord prior to introduction through this hot stretch process was less, by at least 10 percent than the 25° C. cord modulus of normal nylon whereas the emerging cord shows a definite increase in modulus. As is obvious to anyone skilled in the art, analysis of the cords at this point is extremely difficult. Therefore, just what happens to these cords is not known at this time. While not wishing to be bound to any specific theory of operation, it is postulated that some chemical reaction occurs either between the plasticizer additive and the adhesive dip or between the plasticizer additive and the nylon polymer or between the plasticizer additives themselves or between any combination of these. In any event, it is known that plasticized cords according to the present invention, when passed through this hot stretching operation and then used to reinforce rubber vehicle tires show greatly superior results in regard to the flatspotting tendencies of the tires.

It has also been observed that the boiling water shrinkage of the nylon tire cords of the present invention prior to the heat stretching treatment is increased substantially, in some cases by as much as 50 percent, and in all cases at least as much as about 10 percent, over the boiling water shrinkage of untreated nylon cords. This means that the cords of the present invention shrink to a greater extent when treated with boiling water than do conventional, or untreated nylon cords. This again is surprising inasmuch as prior to this time it has been thought that cords which exhibit high boiling water shrinkage performed poorly when used as reinforcement for vehicle tires inasmuch as the flatspot severity increased. However, the cords of the present invention, although exhibiting an increased boiling water shrinkage prior to the heat stretching treament show excellent flatspotting properties when they are fabricated into a tire after they are heat stretched.

The term "organic hydroxylated plasticizer" as used herein is meant to include organic compounds which contain at least one hydroxy group and act as a plasticizer for nylons, that is, act in such a way that the cord modulus of the nylon is decreased. Normally these organic plasticizers contain less than ten carbon atoms and preferably less than seven. They are a liquid at ambient temperatures, that is 20 to 50° C., and have a boiling point above about 150° C. Typical suitable plasticizers which may be used in accordance with the present invention are ethylene glycol, diethylene glycol, triethylene glycol, benzyl alcohol, glycerol, and the like. The amount of plasticizer that must be diffused throughout the nylon cord in order to render them nonflatspotting when fabricated into a tire is critical only to the extent that there must be substantial diffusion of the plasticizer into the cord so that the plasticizer exists in a non-molecular, interstitial relationship with the polyamide molecules of the nylon, and must have the effect on the nylon cord of decreasing the 25° C. cord modulus by at least 10 percent. The exact amount of plasticizer that must be present varies depending on the plasticizer used, the particular nylon in question, and the amount of reduction in flatspot that is necessary. Having these factors in mind, it may generally be said that the amount of plasticizer added to the nylon is normally within the range of 0.5 to 15 percent of plasticizer based on the weight of the nylon, with 2 to 3 percent being preferred.

The manner in which the plasticizer is introduced into the nylon tire cord is also not critical except to the extent that the plasticizer must be introduced after extrusion of the yarns and before the hot stretching operation. Thus, the plasticizer may be introduced into the individual yarns prior to the production of the cord or the plasticizer may be added to the cord itself providing that there is substantial diffusion of the plasticizer into the individual yarns which make up the cord. The plasticizer may conveniently be introduced into the cord or the yarns which make up the cord by dipping either the cord or the yarns into an aqueous solution of plasticizer which may range in concentration from 10 percent plasticizer to 100 percent plasticizer.

In order to more fully and clearly illustrate the present invention, the following specific examples are presented. It is intended that the examples be considered as illustrative only and not limitative.

EXAMPLE I

A three-ply, ten by ten twist cord of nylon 66 (polyhexamethylene adipamide) having a total denier of 2850 was passed through a container containing 100 percent ethylene glycol at a rate of 15.6 yards a minute and wound on a take up bobbin. The cord modulus at 25° C. was measured at 11 grams per denier. After storing for two weeks, this cord was then processed with a Litzler hot stretching machine prior to dipping. In the Litzler machine, the first zone was heated to 325° F. with sufficient tension applied to the cord to allow a 3-percent stretch and a dwell time of 60 seconds. The cord was then passed through a conventional resorcinol-formaldehyde-latex dip and then through a second zone heated to 450° F. with sufficient tension applied to allow a 9-percent stretch and a dwell time of 30 seconds. These cords were immediately embedded into rubber sheets which were made into plies and the plies were built into a tire after an overnight storage. The tire was mounted on a rim and loaded to 1175 pounds against a 67-inch diameter driving wheel. The tire was then run for 15 minutes at 30 miles per hour after which it was held at rest under load for 4 hours. This test is hereinafter termed a 15/30/4 test. This tire was tested for flatspot and found to have a flatspot depth of 118 mils. The tire was then tested under the same load by running for 30 minutes at 60 miles per hour after which it was allowed to rest for 2 hours (a 30/60/2 test). The flatspot level of this test was 112 mils.

In the following examples, 3-ply, ten by ten twist nylon 66 tire cords having a total denier of 2850 were processed in a manner identical to that described in Example I with the exception that the plasticizer employed and the concentration thereof is as indicated:

| Example | Plasticizer | Cord modulus at 25° C. (g./d.) | Flatspot (30/60/2) (mils) |
|---|---|---|---|
| II | Benzyl alcohol (100%) | 7 | 126 |
| III | Diethylene glycol (100%) | 11 | 109 |
| IV | Glycerol (100%) | 13 | 102 |
| V | Ethylene Glycol (100%) | 11 | 124 |
| VI | Triethylene glycol (100%) | 12 | 118 |
| VII | Ethylene glycol (10%) | 11 | 135 |
| VIII | Control (no plasticizer) | 17 | 152 |

EXAMPLE IX

A nylon 66 tire yarn having a denier of 840 was run through a container of 100 percent ethylene glycol at a rate of 26 yards per minute and wound on take up bobbins. After six days storage, this yarn was twisted into a ten by ten twist 3-ply cord which had a cord modulus of 11 g./d. The cord was then processed through the Litzler machine and fabricated into a tire by the procedure as described in Example I. The tires containing the cord produced from the ethylene glycol treated yarn had a flatspot level of 120 mils for 15/30/4 while a control tire, that is, a tire fabricated with untreated cord had an average flatspot value of 150 mils for this test.

It can thus be seen that nylon tire cord treated with the organic hydroxylated plasticizers in accordance with the present invention result in a significant reduction in flatspotting when these cords are used to reinforce vehicle tires. It can also be seen from the above examples that the plasticizers need only be added at any point prior to the hot stretching operation which is conventional for treating cords just prior to their introduction into a tire.

We claim:

1. A nylon tire cord having a total denier above 1000 and having diffused throughout the individual yarns which make up the cord, an organic, hydroxylated plasticizer in a nonmolecular, interstitial relationship to the cord molecules, and in an amount sufficient to decrease the cord modulus of the cord at 25° C. by at least 10 percent.

2. The nylon tire cord as set forth in claim 1 wherein the nylon is nylon 66.

3. The nylon tire cord as set forth in claim 2 wherein the organic hydroxylated plasticizer is ethylene glycol.

4. The nylon tire cord as set forth in claim 2 wherein the organic hydroxylated plasticizer is diethylene glycol.

5. The nylon tire cord as set forth in claim 2 wherein the organic hydroxylated plasticizer is triethylene glycol.

6. The nylon tire cord as set forth in claim 2 wherein the organic hydroxylated plasticizer is glycerol.

7. The nylon tire cord as set forth in claim 2 wherein the organic hydroxylated plasticizer is benzyl alcohol.

References Cited

UNITED STATES PATENTS

| | | | |
|---|---|---|---|
| 3,051,212 | 8/1962 | Daniels | 57—140 XR |
| 3,160,193 | 12/1964 | Baggett et al. | 57—140 XR |
| 3,166,886 | 1/1965 | Kretsch | 57—164 XR |
| 3,218,222 | 11/1965 | Skeen et al. | 117—138.8 XR |
| 3,279,943 | 10/1966 | Skeen et al. | 117—138.8 |
| 3,307,962 | 3/1967 | Hardy | 117—138.8 XR |
| 3,329,633 | 7/1967 | Crovatt | 57—140 XR |
| 3,365,874 | 1/1968 | Chidgey et al. | 57—140 XR |

STANLEY N. GILREATH, Primary Examiner

W. H. SCHROEDER, Assistant Examiner

U.S. Cl. X.R.

57—153; 117—138.8